June 24, 1930.                 W. H. FARR                 1,766,988
                          WINDSHIELD WIPER
                        Filed Jan. 16, 1928           2 Sheets-Sheet 1
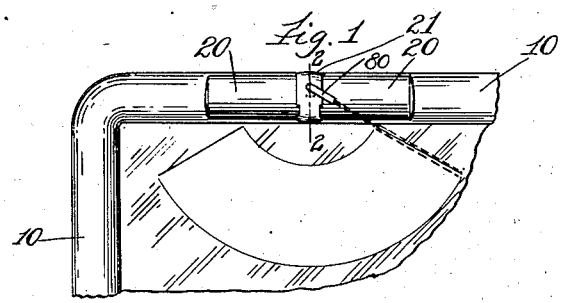
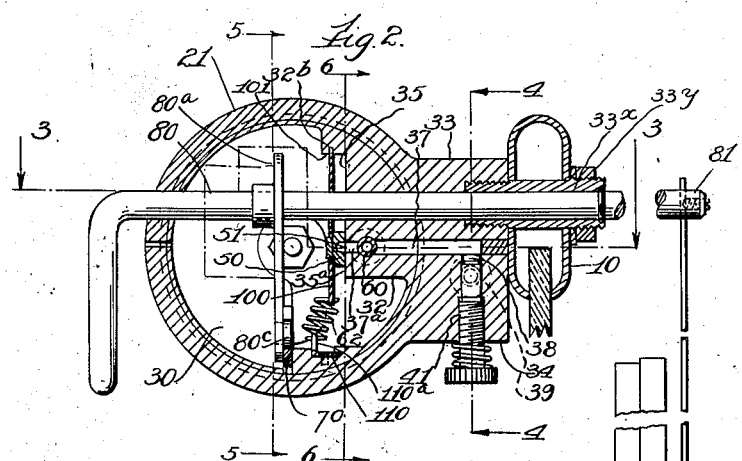
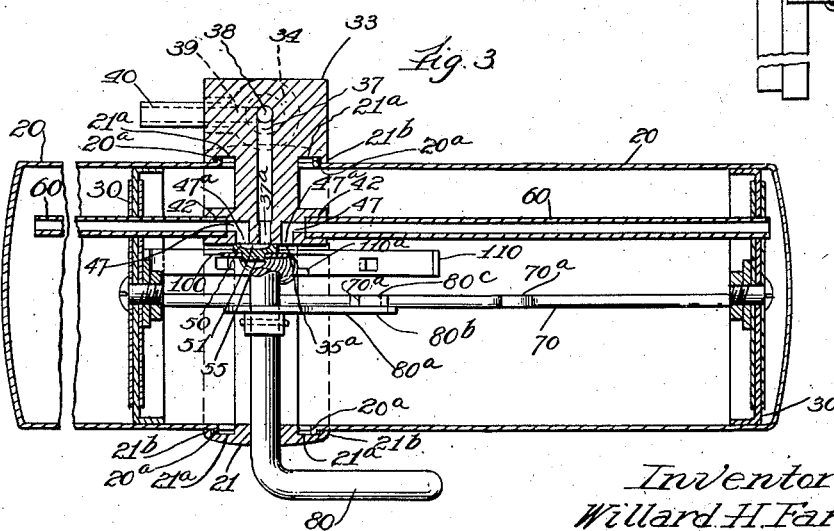
Inventor.
Willard H. Farr.
by Burton & Burton
his Attorneys

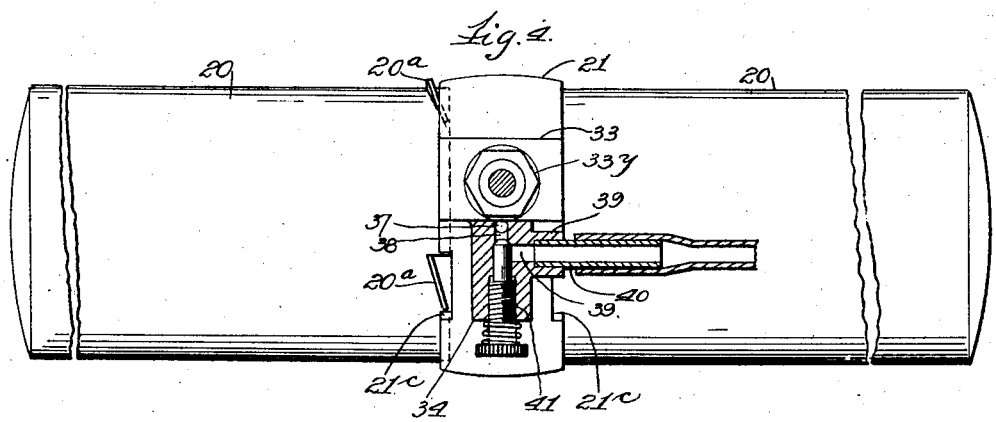
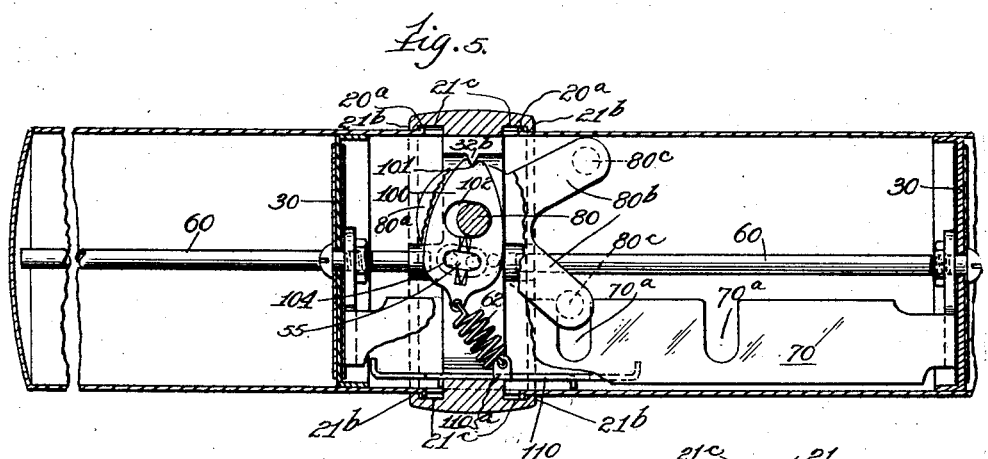
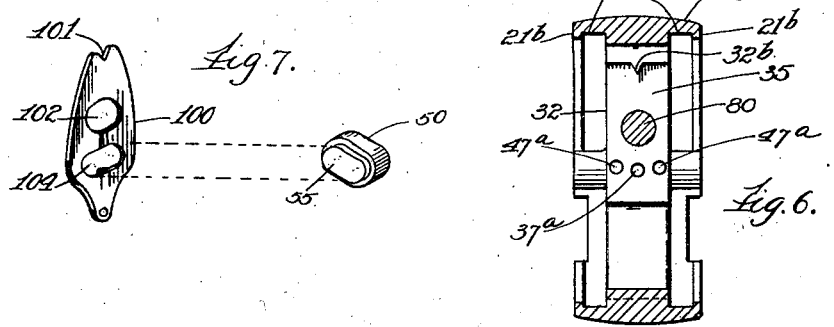
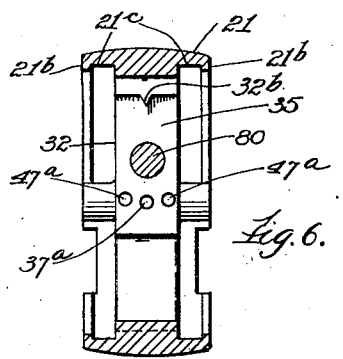

Patented June 24, 1930

1,766,988

UNITED STATES PATENT OFFICE

WILLARD H. FARR, OF CHICAGO, ILLINOIS, ASSIGNOR TO STEWART-WARNER CORPORATION, OF CHICAGO, ILLINOIS, A CORPORATION OF VIRGINIA

WINDSHIELD WIPER

Application filed January 16, 1928. Serial No. 247,029.

The purpose of this invention is to provide an improved construction of windshield wiper and the like adapted to be mounted on the windshield of a motor vehicle and be operated by suction derived from any convenient source as from the engine. It consists in the elements and features of construction shown and described as indicated in the claims.

In the drawings:—

Figure 1 is a rear side elevation of a device embodying this invention shown mounted on the rear or inner side of the windshield to be served.

Figure 2 is a section at the line 2—2 on Figure 1.

Figure 3 is a section at the line 3—3 on Figure 2.

Figure 4 is a detail section at the line 4—4 on Figure 2.

Figure 5 is a section at the plane indicated by the line 5—5 on Figure 2, certain parts being broken away to show the valve device.

Figure 6 is a detail section at the plane indicated by the line 6—6 on Figure 2 showing the valve seat stripped of all co-operating parts.

Figure 7 is an enlarged dissected perspective view of the valve device which co-operates with the valve seat shown in Figure 6.

In the structure shown in the drawings the upper frame bar of the windshield is indicated at 10. The wiper-operating structure comprises two cylinders, 20, 20, each open to atmosphere at one end and closed at the other end, said cylinders being mounted in axial alignment with their open ends proximate and occupied by a junction member, 21, which also serves for securing them together as hereinafter more particularly described. Mounted for reciprocation in each cylinder there is a piston, 30. The junction member is of the general character of a pipe coupling, being in the form of a collar with interiorly and exteriorly protruding bosses, said collar having exterior diameter somewhat greater than that of the cylinders and having at each end an interior groove, 21$^a$, forming a terminal flange, 21$^b$, and having three notches, 21$^c$, across the flange; and each cylinder has its open end which is to be engaged by the junction member diametered for entering and snugly fitting within the flange, 21$^b$, and having struck out from the end three lugs, 20$^a$, positioned for registering with the notches, 21$^c$, when the end of the cylinder is inserted within the flange, 21$^a$, said lugs being slightly inclined to the axis of the cylinder, so that upon engaging one end of the lug behind the flange of the junction member, 21, and rotating the cylinder to carry the lug into the groove, 21$^a$, the cylinder is drawn tightly into the junction member as the rotation of the cylinder carries the lug clear of the notch in which it was entered. The junction member, 21, has an interiorly projecting boss, 32, and an exteriorly projecting boss, 33, from which latter a boss, 34, projects tangentially with respect to the cylinder. The interior boss, 32, is segmental in form, having a flat face, 35, constituting a valve seat, 35$^a$, at a portion of said flat face from which a duct, 37, is formed extending substantially radially with respect to the cylinder through said boss, 32, and into the boss, 34, where it is intersected by a duct, 38, formed in said boss, 34, by boring in from the end of said boss, and said duct, 38, is intersected by a third duct, 39, bored into the boss, 34, parallel to the axis of the cylinder, whereby a continuous communication is formed through the ducts, 39, 38 and 37, from the outside of the cylinders to said valve seat.

A nipple, 40, adapted to receive a small tube to be telescoped onto it is fitted into the end of the duct, 39, and the duct, 38, is bored at the outer end to receive a cut-off valve member, 41, screwed into said duct and having its valve end fitting in the duct, 38, for cutting off the communication from the nipple, 40, to the valve seat, 35$^a$. The boss, 32, is bored from opposite sides toward the middle point, the bores 42, 42 stopping short of the duct, 37, and each adapted to receive a slender tube, 60, which is therein rigidly secured to the junction member, the two tubular members, 60, projecting thus in opposite directions from said junction member toward the closed ends of the cylinders respectively and terminating open near said ends, as seen in Figures 3 and 4. These tubes incidentally serve for guidance of the pistons, 30, 30, respectively in their reciprocation in the respective cylinders by means hereinafter described; but their primary function is to conduct the operating fluid pressures to the opposite ends of the cylinder cavities beyond the pistons respectively, avoiding exterior tubes for that purpose, as more particularly hereinafter mentioned. From the face, 35, of the boss, 32, within what is termed the valve seat area thereof, there are formed at opposite sides of the duct, 37, short ducts, 47, 47, meeting respectively the inner ends of the bores in which the tubular piston guides, 60, 60, are secured, as mentioned, and constituting continuations of the axial passages of said guide members from the remote open ends thereof to the valve seat. For co-operating with said valve seat and with the three ports therein, as above described, there is provided a valve member, 50, which has in its seating face a recess, 51, having its width substantially equal to the diameter of said ports, and its length sufficient to span the middle port and either of the extreme ports, being substantially equal, therefore, to the sum of the diameters of the middle port and an extreme port plus the distance between said ports. For holding this valve on the valve seat and for operating it, there is provided a valve vibrator, 100, which extends across the segment face, 35, being pivoted at its upper end by the engagement of a V-notch, 101, in said upper end with a V-projection, $32^b$, with which the boss, 32, is provided for that purpose, the vibrator being retained in said pivotal engagement by means of a slot, 102, with which said vibrator is provided in position to receive and be engaged by the wiper rock shaft, 80, hereinafter described. The vibrator is adapted to hold the valve, 50, in position for reciprocation on the valve seat by means of a slot, 104, in the vibrator which is engaged by a boss, 55, projecting from the outer side of the valve, 50. The two pistons, 30, 30, are connected together for concurrent movement by a connector, 70, which extends within the cylinders past the junction member, 21, said connector being positioned substantially in the vertical diametric plane of the cylinders and maintained in that position by the pistons which are prevented from rotating by their guidance upon the tubular guides, 60, which, as indicated, by their mounting in the segment boss, 32, are positioned transversely in the plane of the horizontal diameter of the cylinder and thereby nearly 90 degrees around from said connector. As indicated by the description and showings of the tubes, 60, they project through the pistons beyond the limit of the outer position of the latter, for communicating suction and atmospheric pressure alternately to the cylinder cavities between their closed ends and the pistons respectively and avoiding exterior pipes or ducts for that purpose. For actuating the wiper by the reciprocation of the pistons, there is journalled in the junction member at a horizontal plane slightly above the horizontal plane of the guide tubes, 60, 60, a rock shaft, 80, which has one journal bearing in the bosses, 32 and 33, at the forward side of the cylinder, and in an extended cylindrical boss, $33^x$, which projects forwardly from the boss, 33, adapted to project through the upper bar of the windshield, said boss, 34, being threaded for receiving at the outer side of said bar a nut, $33^y$, for securing the entire device to the windshield frame. The rock shaft, 80, projects entirely through and beyond the end of said boss, $33^x$, for receiving the wiper-carrying lever arm, 81, as seen in Figures 1 and 2.

The rock shaft, 80, carries inside the cylinders and junction member a rocker, $80^a$, which consists of two lever arms, $80^b$, $80^b$, each having a pin, $80^c$, projecting laterally near the end of the arm for engaging notches, $70^a$, in the piston connector, 70, whereby in a manner readily understood from the drawings, reciprocation of the connector, 70, rocks the rocker, $80^a$, and the rock shaft, 80, alternately in opposite directions for swinging the wiper arm through any desired angle less than 180 degrees for wiping the glass of the windshield.

Mounted slidingly in the lower side of the junction member there is a slide bar, 110, having a lug, $110^a$, to which there is connected one end of a compression spring, 62, the other end of which is engaged with the lower end of the vibrator, 100. This slide bar is longitudinally dimensioned for encounter of its opposite ends by the opposite pistons respectively in the closing part of the instroke of either piston, and for being moved by the piston in the completion of its instroke to a position at which the line from one connection of the spring to the other has been carried slightly past the position of alignment with the pivot of the vibrator, so that the reaction of the spring from the compression to which it is subjected in the movement of the slide bar under the impulse of the piston operates to thrust the lower end of the vibrator toward the piston which has just encountered and actuated the slide bar, and to thrust the slide bar still further in the direction in which it was thrust by the piston for producing the compression of the spring and the rocking of the valve vibrator. Upon considering this construction it will be understood that the shifting of the valve which is effected by the rocking of the vibrator in the manner described, shifts the communication of the suction duct, 37, whose port, 37ᵃ, at the valve seat is the middle of the three ports, 47, 37ᵃ, 47ᵃ, the port, 47ᵃ, which admitted suction to the end of the cylinder whose piston under the action of the suction performed the stroke in which the opposite piston shifted the communication by encountering the slide, 100, causing the snap action; and that the snap action reversing the valve position, and opening to atmosphere the port which was previously connected with the suction port, admits the suction to the other port causing the other piston to make the reverse stroke, reproducing the initial conditions and repeating the cycle of action described for giving the wiper back-and-forth wiping movement over the windshield glass. It should be understood that the term "junction member" as applied to the part, 21, in the foregoing description and in certain of the claims, is not intended to define the function of that part for securing together the cylinders between whose open ends it is interposed, but only to indicate its relation for affording continuity of structure. And other or additional means may be employed for securement of the parts together, without departing from the invention.

I claim:

1. In a device for the purpose indicated in combination with two cylinders disposed in axial alignment having their remote ends closed and open to atmosphere at their proximate ends, a junction member by which the cylinders are joined at their proximate ends; pistons reciprocably mounted in said cylinders respectively, and means within the cylinders connecting the two pistons for simultaneous reciprocation; an end-to-end-hollow rod extending in each cylinder from a point in the cylinder beyond the outward stroke of the piston therein through the pistons to the junction member, the junction member having a duct open at one end exteriorly of said member and at that end adapted to be connected to a source of suction, and at the inner end arranged for communication with the inner ends of said hollow rods; valve means for shifting said communication of said ducts alternately from one to the other of said hollow rods, and means actuated by the connection between the pistons for operating said valve means to shift said communication at the limit of each stroke of the pistons.

2. In the construction defined in Claim 1, the valve means comprising a rock shaft mounted in the junction member, a valve having a sliding seat on the junction member and pivoted at one end for vibrating on its seat for shifting the connections, means engaging the valve at the other end for shifting it, said valve vibrator having an aperture for the rock shaft elongated in the direction of the shifting movement of the valve for limiting said shifting movement.

3. In the construction defined in Claim 1, the hollow rods being located eccentrically in the cylinders and with respect to the pistons, the operating connection between the two pistons being also positioned eccentrically with respect to the cylinders and pistons, the radial planes in which said hollow rods and piston connections respectively are located being at right angles to each other.

4. In the construction defined in Claim 1, the end-to-end-hollow rods being formed and positioned for guiding the pistons respectively in their reciprocation.

In testimony whereof, I have hereunto set my hand at Chicago, Illinois, this 12th day of January, 1928.

WILLARD H. FARR.